Nov. 2, 1943.  E. D. TILLYER ET AL  2,333,131
PRESSURE MOLD AND PROCESS OF MOLDING
Filed Sept. 13, 1939  4 Sheets-Sheet 1
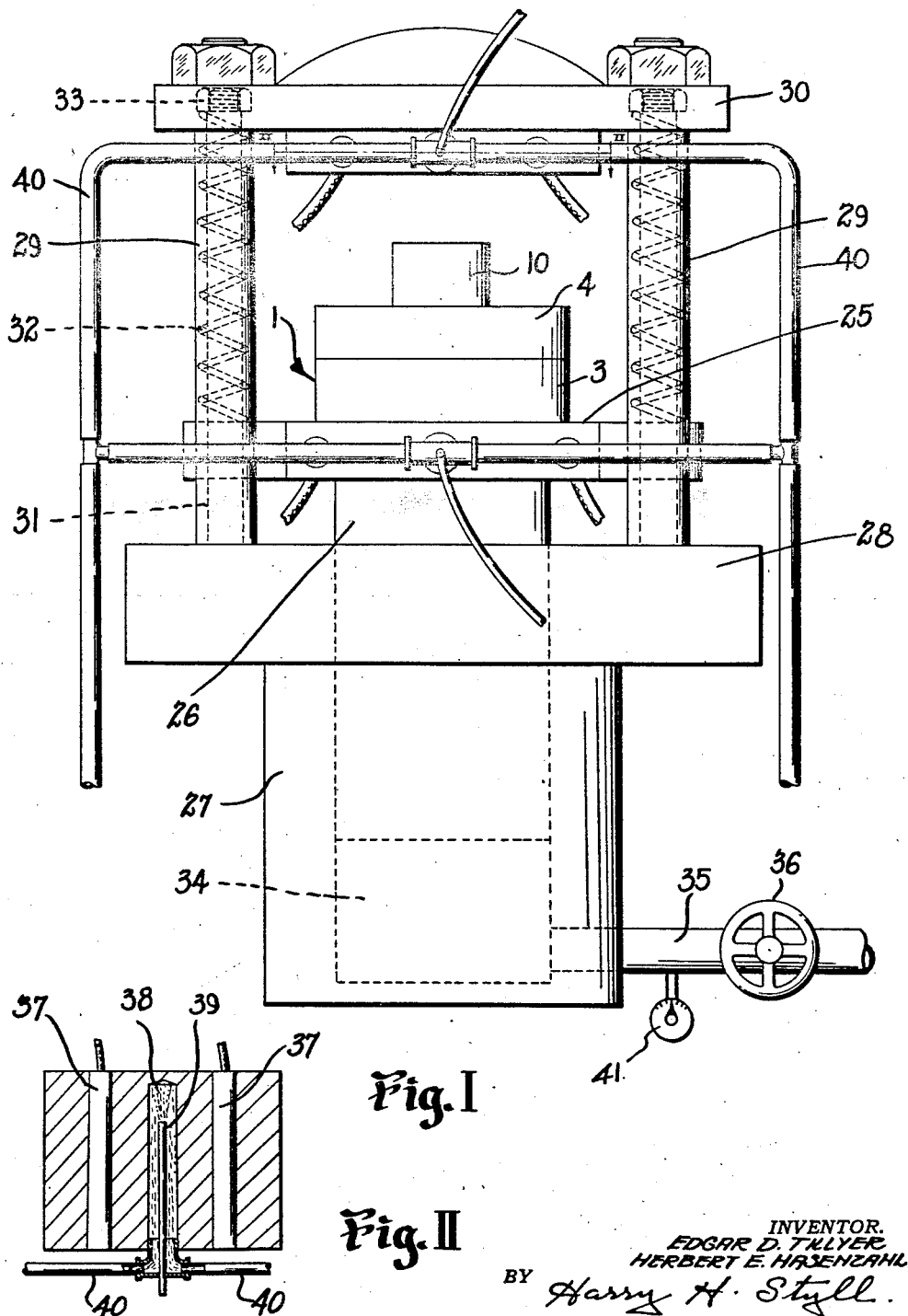
Fig. I
Fig. II
INVENTOR.
EDGAR D. TILLYER
HERBERT E. HASENZAHL
BY Harry H. Styll
ATTORNEY.

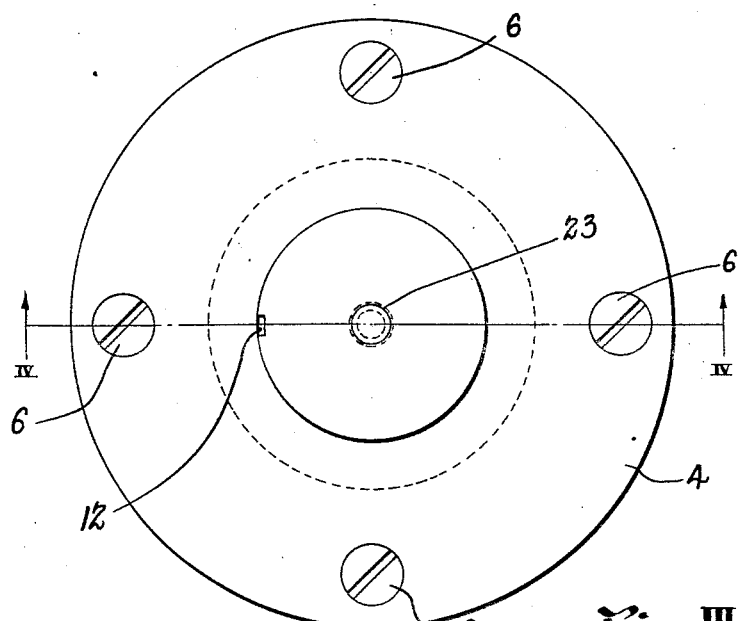
Fig. III
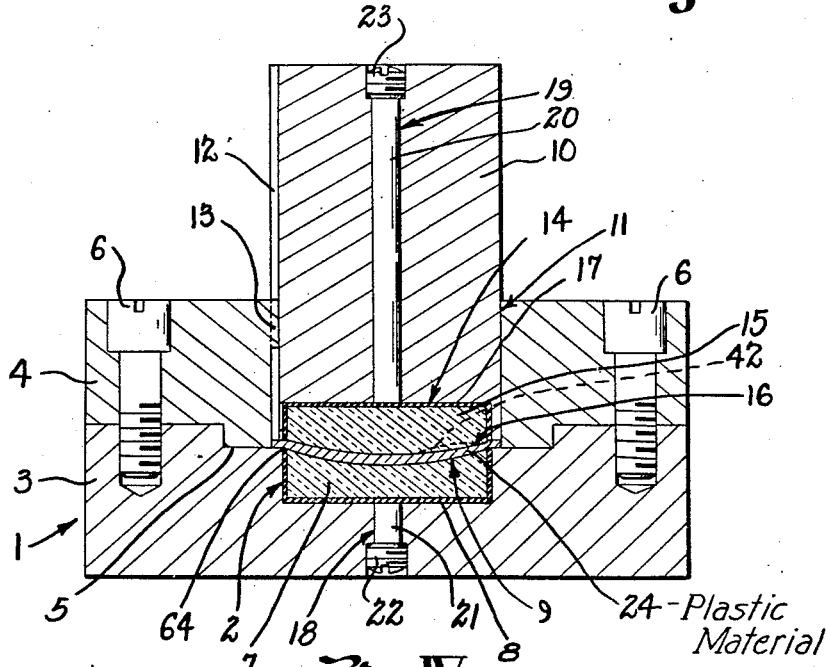
Fig. IV
INVENTOR.
EDGAR D. TILLYER
HERBERT E. HASENZAHL
BY Harry H. Styll
ATTORNEY.

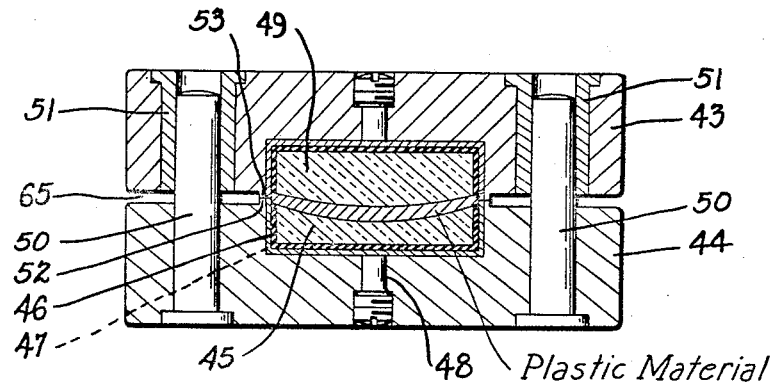
Fig. V
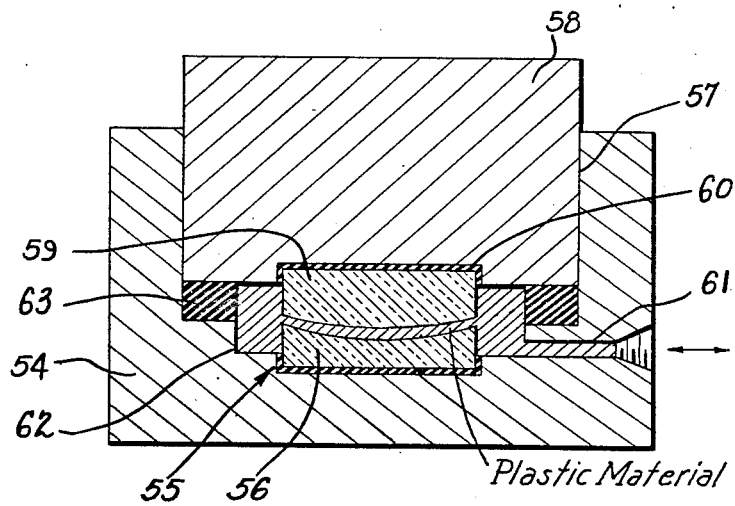
Fig. VI
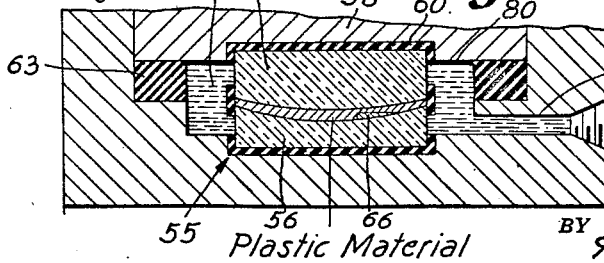
Fig. XIV

Nov. 2, 1943.   E. D. TILLYER ET AL   2,333,131
PRESSURE MOLD AND PROCESS OF MOLDING
Filed Sept. 13, 1939   4 Sheets-Sheet 4
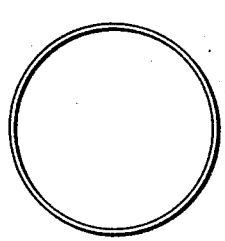 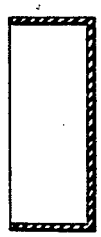 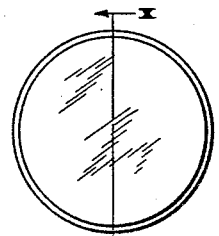 
Fig. VII   Fig. VIII   Fig. IX   Fig. X
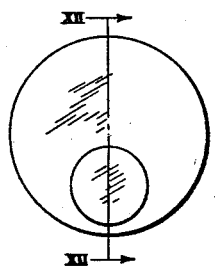 
Fig. XI   Fig. XII
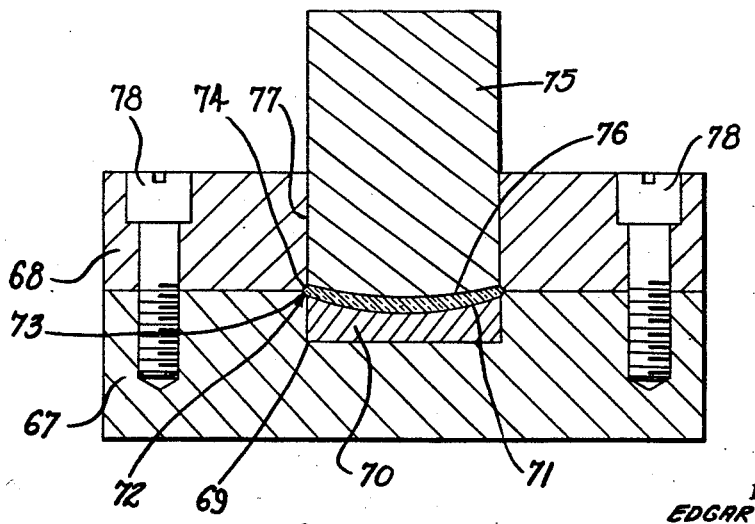
Fig. XIII
INVENTOR.
EDGAR D. TILLYER
HERBERT E. HASENZAHL
BY Harry H. Still
ATTORNEY.

Patented Nov. 2, 1943

2,333,131

UNITED STATES PATENT OFFICE 2,333,131

PRESSURE MOLD AND PROCESS OF MOLDING

Edgar D. Tillyer and Herbert E. Hasenzahl, Southbridge, Mass., assignors to American Optical Company, Southbridge, Mass., a voluntary association of Massachusetts Application September 13, 1939, Serial No. 294,712

9 Claims. (Cl. 18—34)

This invention relates to a new and improved process of molding or pressing to desired shape articles or bodies while in a workable condition, and to improved molding apparatus.

One of the principal objects of the invention is to provide improved means by which the pressing pressures are substantially equalized and substantially equally distributed on the molds during the pressing operations.

Another object of the invention is to provide improved means for protecting the more frangible parts of the molds from breakage during the pressing operations.

Another object of the invention is to provide improved means of equalizing pressure on the molds and protecting the more frangible parts of the molds from breakage so that molds of a highly frangible character such as glass, Bakelite, porcelain, speculum metal, etc., may be employed.

Another object of the invention is to provide improved means by which highly frangible molds with desirable molding surfaces may be used to mold the desired surfaces.

Another object is to provide resilient means for equalizing pressure on the molds and means in cooperative relation with said resilient means for permitting ease of interchangement of molds without altering the relation of the mold with the resilient supporting means therefor.

Another object is to provide a molding or casting apparatus whereby the mold may be filled and heated as desired, and compressed to tne desired pressures without fracturing the frangible mold inserts.

Another object is to provide an apparatus for molding or casting lenses from lens medium either in powder or sheet form or in plastic or liquid state.

Another object is to provide a novel process of molding lenses from synthetic resinous material or other materials having similar characteristics.

Another object is to provide novel means and method of molding single vision or multifocal lenses.

Other objects and advantages of the invention will become apparent from the following description taken in conjunction with the accompanying drawings. It is apparent that many changes may be made in the details of construction, the arrangement of parts, and in the steps of the process without departing from the spirit of the invention as expressed in the accompanying claims. The invention hence should not be confined to the matters shown and described as the preferred forms have been shown by way of illustration only.

Referrring to the drawings:

Fig. I is a front elevation of a press or molding apparatus embodying the invention;

Fig. II is a fragmentary sectional view taken as on line II—II of Fig. I showing the heating and cooling apparatus;

Fig. III is a plan view of a positive type mold embodying the invention;

Fig. IV is a sectional view taken as on line IV—IV of Fig. III;

Fig. V is a view generally similar to Fig. IV illustrating a modified form of mold known generally as a flash type mold;

Fig. VI is a view generally similar to Fig. V of another modified form of mold;

Fig. VII is a top plan view of one of the rubber mold liners;

Fig. VIII is a cross section through the rubber liner illustrated in Fig. VII;

Fig. IX is a front view of a lens molded by the process of the invention;

Fig. X is a sectional view taken as on line X—X of Fig. IX;

Fig. XI is a face view of a modified form of lens;

Fig. XII is a sectional view taken as on line XII—XII of Fig. XI; and

Fig. XIII is a view generally similar to Fig. VI illustrating a further modification of the invention.

Many articles of commerce are molded in plastic condition to a desired configuration and then allowed to set and harden to their final finished condition. The surfaces of the articles so produced while seemingly smooth, did not possess the refinements of an optical surface. Cheap lenses and articles of glass have been molded by heating the glass to a plastic condition and pressing in metal molds, whose temperature is much below the softening point of the glass; these articles while sufficiently good for flashlight lenses, etc., are far from the required surfaces of ophthalmic lenses or other high grade optical products.

Metal molds have been used for molding plastic lenses but it is practically impossible to get a good optical surface on a metal mold or to keep it after it is obtained.

Metals are full of inclusions, specks, etc., which cause holes and flaws in the surface. Many metals also corrode. In the polishing of metal it is usually found that a hole or flaw will appear somewhere before the whole surface is polished.

When it is tried to polish out this flaw others are very apt to appear. Some metals make much better molds than others.

Glass is easily finished to an optical surface and is much more free from flaws than metals. Speculum metal will polish well, is brittle and lends itself to the support of our invention.

Glass molds, because they may be easily finished to an optical surface, are preferable. Such molds however, because of the necessity of high pressure and high temperature, in order to produce homogeneity and prevent the forming of bubbles and surface flaws during molding, are susceptible to breakage.

Attempts have been made to use glass molds. Breakage has been a very serious problem especially when pressures sufficient to produce good molding have been employed. Some attempts have been made to reduce this breakage by hardening the glass, but this fell far short of solving the problem, because of difficulties encountered in carrying out the hardening process and even when hardened a large percentage of breakage occurred. Also hardened glass mold blanks are very difficult to grind and polish, or to keep to accurate curvature because of the release of internal strains. The invention, therefore, is directed more particularly to the use of glass molds which may be provided with desirable highly polished surfaces and to the provision of novel means and method of overcoming disadvantages and danger of breakage and defacing of said molds either by pressure or expansion through the provision of simple, efficient and economical means for distributing molding pressures and for supporting said molds to compensate for variations of expansion so as to guard against their breakage and so that their molding advantages may be obtained.

It has been found that glass is very strong under compression and weak under tension, therefore if pressures are so distributed that all parts of the glass mold is always under pressure or very slight tension, the mold will not break. Therefore the invention is directed to so distributing stresses as to bring about the desired result. This can be accomplished by gas pressure, fluid pressure or elastic or flowable material surrounding the glass mold where the mold is not engaged by the work being formed.

Referring more particularly to the drawings wherein like characters of reference designate like parts throughout the several views the device embodying the invention comprises, as shown in Figs. I to IV inclusive, a molding base 1 preferably of steel or other suitable metal having a molding cavity or recess 2. The base 1, in this particular instance, is formed of two sections, 3 and 4, having a male and female lining connection 5 and held in assembled relation with each other as by screws or the like 6. In the cavity 2 there is supported a mold insert 7. This insert 7 is placed within a cup 8 of resilient material, such as rubber, a rubber compound containing neoprene, or other resilient materials, having a high heat resistance. This cup 8 forms a spacer member between the mold insert 7 and the wall and base of the cavity or recess 2. The mold insert 7 is provided with a highly polished surface 9 to which the material being molded is to be shaped on one side thereof. In this particular instance this surface 9 is a highly polished optical surface of the curvature desired on one side of a lens which is being formed to a given power. In assembling the mold insert 7 in the cavity 2 of the base 1, the mold insert is first preferably placed in the resilient cup 8, is forced into the cavity 2 and the upper or top edges of the cup trimmed off at approximately the level of the peripheral edge of the mold insert 7. The mold insert 7 is preferably formed of glass with the molding surface 9 ground and polished to the curvature and surface texture desired. Speculum metal, or other metals or materials may be used for the mold depending upon the nature of the material to be molded.

A plunger 10 is slidably supported in an opening 11 in the plate 4 so that it may be moved toward and away from the mold insert 7. The plunger is provided with a longitudinal groove 12 in which a suitable key 13 carried by the plate 4 is fitted so as to permit the plunger 10 to be slid in the opening 11 while being held against rotation. The plunger 10 is provided with a cavity 14 similar to the cavity or recess 2 in the base 1. In this cavity 14 there is supported a mold insert 15 having a highly finished surface 16 thereon of the shape and surface texture desired to be formed on the opposed surface of the lens or article being molded. The insert 15, like the insert 7, is preferably placed within a resilient cup 17 which, like the cup 8, functions as a spacer support for the insert internally of the cavity 14. The base 1 and plunger 10 are each provided with a passageway 18 and 19 which, during the placing of the inserts and cup-like members inwardly of their respective cavities or recesses, permits the air to escape. After the mold inserts have been placed in the cavities or recesses 2 and 14, as the case may be, the passageways 18 and 19 are provided with suitable rod-like filler members 20 and 21 retained in said passageways as by threaded retaining members 22 and 23. The purpose of these rod-like members is to close the passageways so as to prevent the material of the resilient cup-like members from flowing inwardly of the passageways during the exertion of pressure on the mold inserts. The material 24 to be molded, with this arrangement, is preferably of the true thermo-plastic type. An amount sufficient to mold the article or lens to the desired thickness is deposited in the molds. The plunger 10 is then inserted, it being understood that the proper mold inserts have been previously selected and placed in the supporting cavities. The assembly is then placed on a press platen 25, see Fig. I. The press platen is supported by a pressure plunger 26 slidably mounted in a base 27. The base 27 has a top portion 28 carrying a plurality of uprights 29. These uprights 29 support a press head 30. The press platen has a sliding guiding contact with the uprights 29. There are preferably four of these uprights arranged to engage the press platen adjacent the corners thereof so as to give a four point slide bearing support for said plate. The top portion 28 also supports spaced uprights 31. These uprights provide means for supporting compression springs 32 which engage the under surface of the compression nuts 33 adjacent the upper ends of the uprights 31 and the upper surface of the press platen 25 adjacent the opposite ends. The pressure plunger 26 is forced upwardly by hydraulic or pneumatic pressure, by air or liquid, directed inwardly by a pressure chamber 34 internally of the base 27 through a suitable feed line 35. A suitable valve 36 is provided for turning on or shutting off the flow of the air or liquid. The press platen and head 30 are provided with heating units 37 of any suitable type either electrical, steam or the like, so as to heat the portions thereof which engage the mold assembly. Heat is transmitted by conduction. It is to be understood that this showing is only by way of illustration as it is quite obvious that the heating units may be formed directly in the mold or parts. The press platen 25 and head 30 are also each provided with suitable means for cooling such as a cavity 38 in which a flow of cool liquid may be directed through a suitable pipe line 39 and allowed to flow outwardly through outlet lines 40, see Fig. II.

In use, the mold assembly is placed on the press platen 25. The pressure is applied to the plunger 26 by opening the valve 36. This forces the press platen and the mold assembly upwardly to engage the plunger 10 with the head 30. The mold assembly is then allowed to be heated through conduction by means of heating units 37. When at the desired temperature the pressure is built up until it reaches a desired amount. This is determined by means of a suitable pressure gauge or the like 41. The heating units 37 are then turned off and the cooling liquid allowed to flow through the head and press platen to fill the mold chamber. The pressure is maintained at a desired level during this cooling. The above procedure is for use with true thermo plastics which soften under heat and harden on cooling. The material 24 to be molded may be originally in powder or sheet form. The temperature to which the plastic is heated depends upon the specific plastic used and can be easily determined by test. It is usually between 300° and 500° F. The pressure employed is usually between 1000 and 2500 pounds per square inch. The proper pressure and temperature for the specific materials may be arrived at through cut and try methods or by experimentation but will be found constant for a given material. The figures, therefore, given here are only by way of illustration.

To control the thickness, the amount of material placed in the mold must be controlled accordingly; if the lens is to be relatively thick more material is used. If it is to be thin less material is used. The exact amount of material can be arrived at by computation or experimentation; if experimental determination of the weight of material is made, it is advisable to start with too much material so the molds will not come in contact by accident. Lenses or articles molded by this process are free from strain and striae and from surface defects, such as pits, bubbles and the like.

Single vision lenses may be molded by this process through the use of continuous surfaces on the mold inserts 7 and 15. If, however, it is desired to mold multifocal lenses, surfaces of different radii may be used on one or more of the mold inserts, for example, as illustrated in Fig. IV, a surface of a different curvature which is illustrated diagrammatically at 42 may be formed on the mold insert 15. This will form a field of a different power in the resultant lens. One or more of such surfaces may be used and the contours of the areas of forming said surfaces may be varied according to the shape of field desired. With the mold insert 15 having the surface 42 thereon a lens, such as illustrated in Figs. XI and XII, would be formed. With molds having continuous surfaces, a lens such as illustrated in Figs. IX and X would be formed.

In Fig. V there is illustrated a modified form of mold comprising two sections 43 and 44. The section 44 is provided with a cavity in which is supported a mold insert 45. This mold insert in this particular instance is supported in a resilient cup 46 which is in turn supported internally of a metal cup 47. The metal cup is so dimensioned as to intimately fit within the cavity in the section 44. A suitable air escape passageway 48 is provided similar in detail to the arrangement illustrated in Fig. IV. The section 43 supports the opposed mold insert 49 in a manner similar to that of the mold insert 45. The section 44, in this particular instance, is provided with guide pins 50. The plate 43 is provided with suitable bushings 51 which have a sliding fit with the pins 50. The purpose of this arrangement is to maintain the mold inserts 45 and 49 in proper aligned relation with each other. The plates 43 and 44 are each provided with protrusions 52 and 53 which in this particular instance are in the form of annular raised portions which are adapted to be moved into engagement with each other and serve as cut off means for excessive material which flows outwardly of the mold inserts and also governs the resultant thickness of the lens or article to be molded. In this particular instance, plactic materials either in the form of powder or sheet stock might be used. The assembly is placed in the press illustrated in a manner set forth above. The purpose of placing the inserts in rubber cups contained within a metal cup is to permit and facilitate ease in interchanging molds. When it is desired to remove the molds a suitable tool may be inserted in the passageways 48 to eject the insert, such as illustrated in Fig. V.

In Fig. VI there is illustrated a further modification comprising a base 54 having a mold cavity 55 in which a suitable mold insert 56 is supported. The base 54 is provided with a recess 57 in which is slidably supported a plunger 58. This plunger supports a mold insert 59. It is to be understood that the mold inserts 56 and 59 are supported by resilient cup members 60 and, like the mold inserts 7, 15, 45 and 49 are preferably formed of glass. In this particular instance, the base 54 is provided with an inlet 61 and the material to be molded is in liquid form and is known as cast resin. This resin is in an unpolymerized state and is preferably flowed into a cavity 62 communicating with the mold inserts 56 and 59. In molding with this apparatus the assembled elements of the mold are placed in a press such as illustrated in Fig. I or the like. The plunger 58 carrying the mold insert 59 is normally in such a position as to space the mold insert 59 from the mold insert 56 an amount greater than the thickness of the article to be formed from the mold inserts 56 and 59. The unpolymerized plastic or resin is flowed inwardly of the cavity 62 under pressure. While held under this pressure the plunger 58 is forced inwardly of the base 54 to compress the plastic between the faces of the mold inserts 56 and 59. The thickness is regulated by the extent of movement of the plunger 58 inwardly of the base 54 and the pressure on the liquid or unpolymerized resinous material which is flowed inwardly of the passageway 61 is maintained at an amount sufficient to compress the material between the facings of the mold inserts 56 and 59 the desired amount. While held under compression the molds are heated and the heat is carried by conduction to the mold inserts which, in turn complete polymerization and cause the resinous material to harden and set to the shape of the finished surfaces of the inserts. In order to seal the liquid from flowing outwardly of the mold, a suitable resilient packing or gasket 63 is provided. This is of a resilient nature so as to permit the plunger 58 to be moved toward the mold insert 56 while maintaining the desired sealed relation of the parts. It is to be understood that instead of using resin in an unpolymerized state the powdered form or sheet form might be used with this device. This is true of all of the different type molds herein described. Thermo-plastics which are normally of a powdered form may be spread over the molds and compressed and may be of the thermo setting type which hardens under the action of heat.

In instances when plastics in powdered form or sheet form are used with the device illustrated in Fig. VI, the said plastic is placed between the mold inserts 56 and 59 and a liquid, such as glycerine, is flowed in under pressure through the passageway 61 into the chamber 62 so as to build up a pressure around the plastic between the mold inserts. In this instance a band of resilient material 80 shown in full lines in Fig. XIV is used to prevent the liquid from mixing with the plastic material. This is to aid in building up a pressure on the plastic material to prevent the material from being forced outwardly from between the mold inserts during the exertion of said pressure, and also to prevent formation of bubbles.

During the application of this molding pressure the compressible cups 8 and 14 or other similar cups throughout the several views will compress resiliently and will evenly distribute the pressure strains and stresses throughout the mold inserts and thereby guard the molds from being broken, particularly if they are formed of a frangible material, such as glass. This even distribution of the pressure strain is of particular importance, as regards the safe guarding of the sharp edges and acute angles of the molds, such as illustrated at 64 in Fig. IV, from becoming crushed and broken during the molding operation.

Referring to Fig. IV it will be noted that the relatively frangible dies or molds 7 and 15 have the sides of their outer edges in substantial alignment, one with the other, and also that the recesses 2 and 14 for the compressible seating of the dies have the edges of their outer sides in substantial alignment, one with the other. It will also be noted that the outer edges of the article 24 being molded between the dies extend outwardly between the upper and lower ends of said respective recesses as the article is compressed between the dies, so that the compressing pressure between the dies is transmitted to the compressible fillers in the said recesses to equalize the molding pressure on the sides of the dies with that on their molding faces. This is of great importance because this compressing pressure is transmitted to the said fillers, be they resilient material like rubber or a compressible gas, fluid or other compressible material capable of transmitting in a flowable manner the said compression between the molding faces of the dies and in the seats around said dies, thus tending to prevent the cracking and breakage of the dies when the molding pressure is applied, and particularly the prevention of such cracking and breakage at the corners of the outer edges of said dies. Such cracking and breakage of dies has been one of the most pronounced defects of prior structures.

The same conditions are present as above in the constructions shown in Figs. V and VI.

This invention is of particular merit and importance in the molding of lenses from plastics or synthetic resins which are transparent and lighter than glass and which have now become of such first importance in the commercial arts that it is one of the most important contributions to the arts in the last decade.

Many forms of molds and many forms of material for molding can, of course, be utilized under this invention.

Glass molds have been found to be the most desirable for the molding of the synthetic resins. The difficulty with the molding, however, has been the probable cracking and splintering of the molds due to the excessive pressure required during such molding. Many experiments have been tried to overcome this, including the hardening or tempering of the glass molds, but before our invention, as far as we are aware, the splintering and cracking of the molds has not been corrected or prevented. With our invention ordinary glass molds may be used without hardening or tempering. The invention is very efficient and it provides a great economy as the molds are quite expensive and through the elimination of such breakage a great saving is effected. Due to the requirement of various different combinations of optical surfaces, in order to produce the various prescriptive corrections required, such molds are great in number running into thousands of molds for the production of lens surfaces. With the present arrangement, the molds may be quickly and easily interchanged without danger of breakage. The resilient supports compensate for variations in expansion of materials used, particularly in the materials of the main support of the mold and the materials of the inserts mounted in said supports, as well as distributing pressure uniformly. Careful and close fitting of the parts is not necessary as slight variances in dimensions of the mold inserts and cavities or recesses in which they are supported are compensated for by the resilient cup-like members.

It is of extreme importance prior to the performing of the molding operations that the faces of the molds be thoroughly cleansed. This can be accomplished by the use of suitable cleansing liquids or the like.

In connection with the mold illustrated in Fig. V, it is to be noted that the sections 43 and 44 are provided with a space 65 surrounding the mold inserts 45 and 49. This is to receive the overflow of material during the molding operation.

Although we have described one form of heating and cooling apparatus, it is to be understood that many different types of heating and cooling may be used. One of the preferred resinous materials has the characteristics of polymerized methyl methacrylate and is clear and transparent and particularly resistant to corrosion and weathering and is light in weight and relatively nonfrangible. Some other materials are complicated co-polymers as produced by various chemical laboratories.

Although we have shown and described the molding of both surfaces on the lenses simultaneously it is to be understood that only one of the surfaces could be molded if desired, particularly when material of the true thermoplastic type is used. As this material is sufficiently hard upon cooling and setting, the opposed surface of the lens can be abraded. This is of particular importance in the forming of semi-finished type of blanks and permit the dispensing of said blanks in a manner similar to usual glass lenses now in commercial use.

The surfaces of these frangible molds may be made in the manner ordinary lens surfaces are produced and are computed by the usual methods, taking into account the index of refraction of the materials to be molded as well as their thickness, to give the desired optical power.

This molding of one surface only is of utmost importance in the forming of multifocal lens blanks as surfaces of compound curvatures may be formed in a simple and efficient manner which ordinarily are very difficult to form by direct curve surface generation. For example, by reference to the forming of a mold insert 15 having an additional surface curvature 42 thereon, it will be noted that the first or main surface 16 may be generated by direct surface grinding and that the additional or main surface 42 may thereafter be ground and polished by direct surface generation through the use of simple abrading tools. This main surface 16 is formed to such a depth as to reduce the contour of the surface area 42 to the desired diameter. This, of course, results in the molded lens having a raised surface in the vicinity of the area 42 which, in direct surface generation, is more or less difficult to form. This therefore greatly simplifies the forming of this type or similar types of lenses. This type of lens is known commercially as a one-piece type wherein one side of the lens has compound surfaces thereon.

Although we have shown and described the forming of a one-piece type multifocal lens it is to be understood that a separate insert or wafer might be supported on one of the molds, as illustrated diagrammatically at 66 is Fig. VI. This could be a wafer of glass or resinous material and could be retained in place by suitable adhesive. The remaining plastic material of the lens could be placed directly over this wafer and the entire mass compressed thereby embedding the wafer in the body of the lens and forming what is known commercially as a Kryp-tok lens. It is to be understood that the wafer would have to be of a material having a higher melting point than the remainder of the plastic used for the main body of the lens.

If desired, the lenses could be molded with a bevelled contour edge, that is, could be molded to the finished desired contour shape and size through the provision of a molding apparatus, such as illustrated in Fig. XIII. In this instance, the mold comprises a base plate 67 having an additional plate 68 supported thereon. In this instance, the base 67 is provided with a cavity or recess 69 in which the mold insert 70 is supported. The insert 70, in this particular instance, is preferably of a metal on which a highly polished surface 71 of a desired curvature shape is formed. This metal has a relatively hard brittle nature and is capable of having a highly polished surface formed thereon. This type of mold is preferably used only in instances when it is desired to form the lenses to the desired contour shape and with a bevelled edge, such as illustrated diagrammatically at 72, and the surface texture of the lenses do not have to have the high quality for which glass molds are required. In this instance, the base 67 adjacent the periphery of the cavity in which the mold insert 70 is supported, is provided with a bevelled edge 73 which forms the bevel on one side of the lens and the plate 68 is provided with a similar bevel 74 forming the bevel on the opposite side of the lens. When the plates 67 and 68 are in fitted relation with each other a sharp V type bevel will be formed. A plunger 75 having a surface curvature 76 of the desired shape on the inner end thereof is mounted to be reciprocated in an opening 77 and the plate 68. Suitable screws or the like 78 hold the plates 67 and 68 in desired aligned relation with each other. The use of the device from this point on is generally similar to that set forth in the above device. The material used is spread over the face of the mold insert 70 and the plunger 75 is then compressed so as to mold the material into the V-notches surrounding the inserts 70 and the amount of pressure is such as to reduce the lens to the desired thickness and surface texture.

In the constructions illustrated in Figs. IV, V, VI and so forth the portions 3 and 4 or similar portions are preferably formed of steel. The mold inserts are preferably formed of glass but it is to be understood that other suitable materials having characteristics on which desirable highly polished surfaces may be formed might be used. These inserts might be of metal or might be of other plastic materials which have a higher melting point than the material of the plastics which are to be molded. In instances when highly polished lens blanks are formed with only one molded and finished surface thereon the opposed surface is formed by abrading in the usual manner and with the usual known commercial apparatus and abrading tools. It is advantageous, when finishing one side by molding and the other side by grinding and polishing, to adjust the index of refraction of the plastic to correspond with the index of ordinary ophthalmic glass, so standard commercial tools may be used.

From the foregoing, it will be seen that we have provided simple, efficient and economical means for obtaining all of the objects and advantages of the invention.

Having described our invention we claim:

1. In the process of molding with a die the step of extruding a portion of the article being molded into contact under the molding pressure with a compressible substance surrounding the sides of the die located in a substantially closed chamber to equalize the pressure on the sides of the die with that on its molding face.

2. A method of utilizing an equalizing pressure chamber for forming optical lenses and the like from thermoplastic material, comprising: placing thermoplastic material between the opposing faces of male and female die members, surrounding the extreme ends and sidewalls of the die members with a flowable material, compressing the opposing dies to a desired pressure so that compression of the thermoplastic material ensues causing a portion of said thermoplastic material to extend beyond the peripheral edges of the die faces so that increased pressure on the opposing die members will cause an increased pressure throughout the entire chamber, said increased pressure being equally distributed substantially throughout said chamber and exerting equal force on all surfaces within said chamber to the end that the increased pressure will be equalized on the sidewalls of the die members to prevent any unequal strain on the more frangible portions on the die when the pressure is increased within said chamber.

3. A method of forming optical lenses and the like which have a desired focal length from thermoplastic material, comprising the step of placing thermoplastic material between the die faces of opposing dies, compressing the opposing dies to a desired pressure, simultaneously with said compression of said die members causing a counter pressure having at least one counter pressure component at an angle to the direction of compression of the die members so that the counter pressure will cause an equal pressure to be exerted at substantially every point on the sides of the dies, said counter pressure being substantially equal to the compression force exerted on the opposing dies.

4. A method of forming optical lenses and the like from thermoplastic material, comprising the step of placing a blank of thermoplastic material between the die faces of opposing dies, compressing the opposing dies to a desired pressure, simultaneously with said compression of said die members causing a counter pressure having at least one pressure component at an angle to the direction of compression of the dies so that the counter pressure will cause substantially an equal pressure to be exerted at substantially every point on the exterior of the dies, said counter pressure being substantially equal to the force of compression.

5. A method of forming optical lenses and the like from moldable material located in a pressure equalizing chamber comprising the steps of placing moldable material between the opposing faces of die members, surrounding the outer ends and sidewalls of the die members with a flowable material, compressing the opposing dies to a desired pressure so that compression of the moldable material causes some of the moldable material to move toward the peripheral edges of the die faces so that increased pressure on the opposing die members will cause an increased pressure throughout the entire chamber, said increased pressure being equally distributed throughout said chamber and exerting equal force on all surfaces within said chamber to prevent any unequal strain on the more frangible portions on the die when the pressure is increased within said chamber.

6. A method of forming optical lenses and the like having a predetermined focal power, said optical lenses being made from organic thermoplastic material, comprising the steps of locating two opposing die members in a pressure equalizing chamber, placing a thermoplastic material between said opposing die members and exerting pressure thereon, substantially simultaneously exerting a second independent pressure within the equalizing chamber, said second pressure being substantially equivalent to that of the compression force on the die members, and causing an equalizing of pressure within said chamber due to the force exerted by the die members and said second pressure means so that equal pressure obtains against all surfaces within the pressure chamber causing said thermoplastic material to be substantially molded to the contour of the faces of the die member.

7. A device of the class described comprising a molding die consisting of opposing die members, means for supporting said die members in a closed die chamber, pressure transmitting means intermediate said die supporting means and said dies, a portion of said die chamber forming a recess about the peripheral edges of the molding faces of the dies, and means for exerting molding pressure on the die, to the end that the molding pressure exerted upon the dies will force the material of the article to be molded intermediate the dies to emerge toward the peripheral edges of the dies and engage the pressure transmitting means causing a supporting counter pressure upon the sides and other portions of the dies within the die chamber.

8. A device of the character described comprising a molding die, means for exerting molding pressure on the die, a closed die chamber having means for seating the die and forming a recess about a portion of the sides of the die, and a flowable filling in said recess, whereby a portion of an article to be molded may be compressed under the molding pressure and form an intimate contact with the flowable filling in the recess to substantially equalize the pressure on the sides of the die with that of its molding face.

9. In the process of molding with a die in a substantially closed chamber the step of forcing a portion of the article being molded into a desired configuration while under molding pressure, simultaneously surrounding the sides of the die with a flowable material different from the material of the article to approximately equalize the pressure on the sides of the die with the pressure on its molding face.

EDGAR D. TILLYER.
HERBERT E. HASENZAHL.